(12) United States Patent
Kawamura et al.

(10) Patent No.: US 7,810,931 B2
(45) Date of Patent: Oct. 12, 2010

(54) LIGHT SOURCE APPARATUS, OPTICAL MODULATION APPARATUS, DISPLAY APPARATUS, LIGHT CONDENSE ILLUMINATION APPARATUS AND PROJECTION TYPE COLOR DISPLAY APPARATUS

(75) Inventors: Atsushi Kawamura, Yokosuka (JP); Hibiki Tatsuno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 964 days.

(21) Appl. No.: 11/489,614

(22) Filed: Jul. 20, 2006

(65) Prior Publication Data

US 2007/0024977 A1 Feb. 1, 2007

(30) Foreign Application Priority Data

Jul. 27, 2005 (JP) ............................. 2005-216974
Feb. 3, 2006 (JP) ............................. 2006-027132

(51) Int. Cl.
  *G03B 21/20* (2006.01)
(52) U.S. Cl. ....................................... 353/38
(58) Field of Classification Search ................... 353/20, 353/102, 38; 362/237, 244, 286, 309, 551, 362/317, 326; 359/448, 619, 620, 621, 622, 359/623, 624, 625, 626, 627, 628
  See application file for complete search history.

(56) References Cited

U.S. PATENT DOCUMENTS

| | | | | |
|---|---|---|---|---|
| 5,884,991 A | * | 3/1999 | Levis et al. | 353/122 |
| 6,038,005 A | * | 3/2000 | Handschy et al. | 349/61 |
| 6,227,669 B1 | * | 5/2001 | Tiao et al. | 353/31 |
| 6,547,421 B2 | * | 4/2003 | Sugano | 362/268 |
| 7,052,138 B2 | * | 5/2006 | Matsui | 353/31 |
| 7,232,227 B2 | * | 6/2007 | Yamasaki et al. | 353/94 |

(Continued)

FOREIGN PATENT DOCUMENTS

JP     2001-343706      12/2001

(Continued)

OTHER PUBLICATIONS

"The Optical Efficiency of LCD Projector Systems", Optical and Electro-Optical Engineering Contact, vol. 37, No. 9, 1999, pp. 606-614.

(Continued)

*Primary Examiner*—Georgia Y Epps
*Assistant Examiner*—Bao-Luan Le
(74) *Attorney, Agent, or Firm*—Oblon, Spivak, McClelland, Maier & Neustadt, L.L.P.

(57) ABSTRACT

A light source apparatus, including: an array light source in which a plurality of emission light sources is arranged; a divergence characteristic controller disposed corresponding to the array light source and configured to control a divergence characteristic of each of the emission light sources of the array light source; and a focusing optical element configured to control a directivity of light emitted from each of the emission light sources of the array light source, and the array light source, the divergence characteristic controller, and the focusing optical element are arranged in this order in a direction of emission from the array light source, and a following formula is satisfied:

$$0.067 \leq L/f < 1.1$$

where an effective diagonal length of the array light source is L and a focal distance of the focusing optical element is f.

8 Claims, 10 Drawing Sheets

U.S. PATENT DOCUMENTS

| | | | |
|---|---|---|---|
| 7,246,923 B2 * | 7/2007 | Conner | 362/309 |
| 7,300,177 B2 * | 11/2007 | Conner | 362/244 |
| 7,410,264 B2 * | 8/2008 | Yamasaki et al. | 353/94 |
| 7,427,146 B2 * | 9/2008 | Conner | 362/268 |
| 2001/0048560 A1 * | 12/2001 | Sugano | 359/618 |
| 2002/0196414 A1 * | 12/2002 | Manni et al. | 353/31 |
| 2004/0114250 A1 * | 6/2004 | Kato | 359/626 |
| 2004/0207816 A1 * | 10/2004 | Omoda et al. | 353/31 |
| 2004/0263500 A1 * | 12/2004 | Sakata | 345/204 |
| 2005/0007390 A1 * | 1/2005 | Yoshida et al. | 345/690 |
| 2005/0174768 A1 * | 8/2005 | Conner | 362/235 |
| 2005/0174771 A1 * | 8/2005 | Conner | 362/244 |
| 2005/0174775 A1 * | 8/2005 | Conner | 362/268 |
| 2006/0132725 A1 * | 6/2006 | Terada et al. | 353/102 |

FOREIGN PATENT DOCUMENTS

| | | |
|---|---|---|
| JP | 2002-244211 | 8/2002 |
| JP | 2002-303932 | 10/2002 |
| JP | 3433647 | 5/2003 |
| JP | 2003-161909 | 6/2003 |
| JP | 2004-109767 | 4/2004 |
| JP | 2005-117602 | 4/2005 |
| JP | 2005-278132 | 10/2005 |
| JP | 2006-71817 | 3/2006 |
| JP | 2006-84753 | 3/2006 |
| JP | 2006-330328 | 12/2006 |
| JP | 2007-47335 | 2/2007 |
| JP | 2007-47418 | 2/2007 |
| JP | 2007-47707 | 2/2007 |
| JP | 2007-72172 | 3/2007 |

OTHER PUBLICATIONS

"The Optical Efficiency of LCD Projector Systems", Optical and Electro-Optical Engineering Contact, vol. 37, No. 9, 1999, pp. 606-614.

* cited by examiner

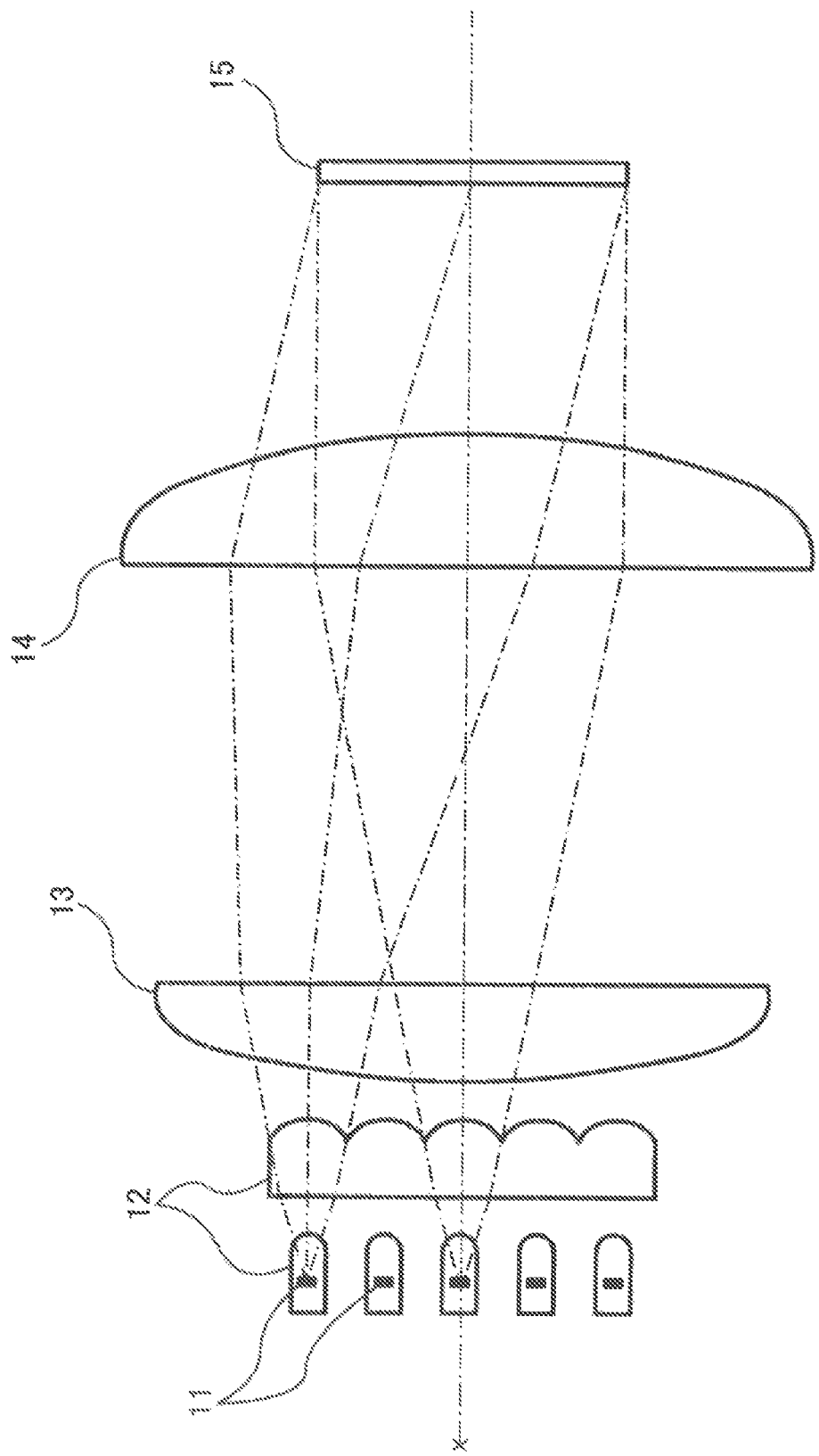

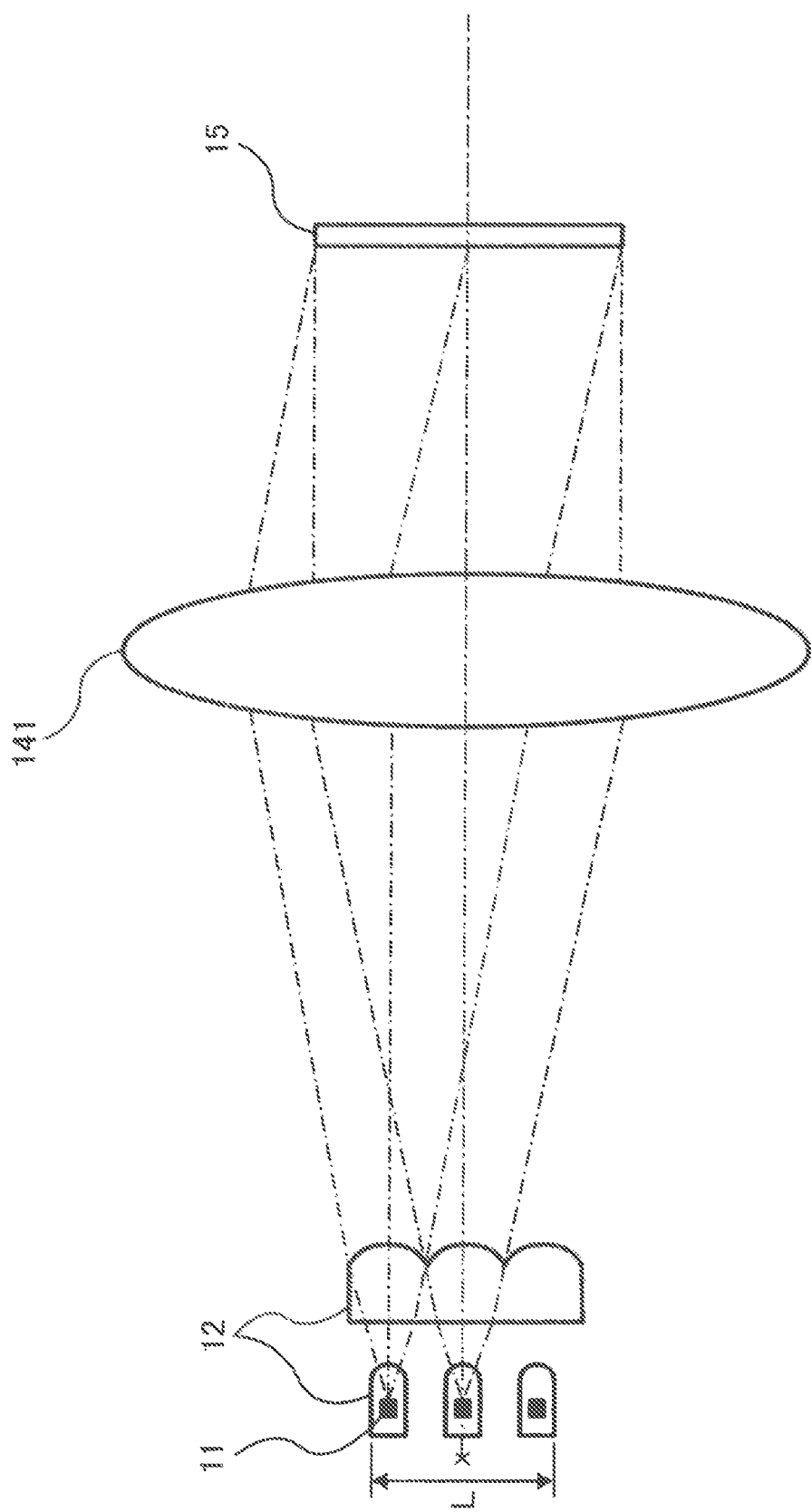

SHELL TYPE/HALF-POWER ANGLE: ±30°

LENS+DR TYPE/HALF-POWER ANGLE: ±10°

SURFACE IMPLEMENTATION TYPE/HALF-POWER ANGLE: ±7°

LIGHT SOURCE APPARATUS, OPTICAL MODULATION APPARATUS, DISPLAY APPARATUS, LIGHT CONDENSE ILLUMINATION APPARATUS AND PROJECTION TYPE COLOR DISPLAY APPARATUS

BACKGROUND

The present invention relates to a light source apparatus, an optical modulation apparatus, a display apparatus, a light condense illumination apparatus and a projection type color display apparatus, capable of effectively performing light condense illumination relative to a predetermined range as well as attaining miniaturization and a thinner size.

A discharge lamp such as a high-pressure mercury lamp, a metal halide lamp or the like is utilized as a light source in a conventional projection type color display apparatus. Such a discharge lamp is large in size, and hence, a size of an optical system as a whole including a light source portion becomes large. In addition, because light emitted by the discharge lamp includes infrared light, a large amount of heat is radiated to an environment, which makes filters, a cooling fan and so on indispensable. Thus, there are many disadvantageous in the conventional projection type color display apparatus utilizing the discharge lamp in terms of cost, size, noise, etc.

In addition, the light radiated from the lamp mentioned above is white light. Accordingly, in order to perform color-displaying, it is required to separate the light into three colors of R (red light), G (green light) and B (blue light) as three primary colors of light, and to provide an optical modulator with respect to each of the colored lights. Each of the colored lights modulated by the corresponding one of the optical modulators is then synthesized, and the synthesized light is then directed toward a projection lens. Hence, a further problem arises in the conventional projection type color display apparatus in that the optical system thereof becomes even large in order for performing the color separation and the color synthesis.

As an alternative method in the conventional projection type color display apparatus described above, there has been known a method in which the modulation of light is performed by a single liquid crystal optical modulator provided with a color filter, without performing the color separation. However, since the number of pixels of the optical modulator is restricted, the number of pixels becomes approximately one-third, and thus such a method cannot perform high definition displaying.

On the other hand, there has been proposed recently a projection type color display apparatus in which light emitting diodes (LEDs) are utilized as a light source. Because the LED is small in itself, modulation speed is fast, and a so-called field sequential type displaying is thereby possible.

The field sequential type displaying is a type of displaying in which a single optical modulator is used, and the LEDs of respective three colors of R, G, B are time-sequentially lit and an optical modulation element is turned on or off in synchronization with the time-sequential lighting of the LEDs. This method enables performing of the color-displaying with the single optical modulator without decreasing the number of pixels. Therefore, luminous efficiency improves greatly, and accordingly, there has been a growing possibility that the LEDs, although brightness thereof used to be scarce, may be adopted for an illumination light source of a display apparatus. However, even if the improvement of the luminous efficiency is realized, consideration for even brighter display apparatus is desired.

As a conventional technology relating to a display apparatus such as a digital projector or the like, to an optical modulation apparatus used in such a display apparatus, and to a general illumination optical system such as an illumination apparatus, the inventions disclosed in JP2001-343706A, JP2002-244211A, JP2002-303932A and JP-H10-301201A are known. A technology relating to a general illumination optical system apparatus, in which a white light lamp such as a high-pressure mercury lamp, a xenon lamp, a metal halide lamp and so on is used as a light source, is disclosed on pages 606-614, "The Optical Efficiency of LCD Projector Systems" of a non-patent document titled "Optical and Electro-Optical Engineering Contact" vol. 37, published in 1999.

JP2001-343706A discloses the invention in which a plurality of light sources, each structured by LEDs and a coupling lens, are arranged, and each light emitted therefrom is adapted to illuminate a light valve through a condenser lens, integrator and two condenser lenses.

JP2002-244211A discloses the invention in which LEDs as a light source and an illumination system having a polarization converting element allay are employed. The invention of JP2002-244211A is possible to reduce a loss of light due to polarization and to achieve a balance between miniaturization and high luminous efficiency.

As to JP2002-303932A, it discloses the invention which provides a displaying method in a case in which a reflective type optical modulation element is used.

With regard to JP-H10-301201A, the invention thereof provides a projector apparatus in which LEDs are utilized as an illumination light source. The invention disclosed in JP-H10-301201A uses an alley light source which is larger than a liquid crystal spatial modulator and also uses a reduction optical instrument for an illumination system, so as to improve brightness.

However, the inventions described above have drawbacks as follows.

For example, the technology disclosed in the non-patent document is accompanied with a large amount of infrared ray, i.e. accompanied with radiation of a large amount of heat. It is also difficult to maintain a balance of a light amount of each R, G and B as so-called three primary colors of light by color-separation/synthesis performed by a dichroic mirror/prism, and thus there is a limitation in color-reproducibility. Further drawbacks are that a size of a body of the apparatus becomes large, and the number of components is increased.

The invention disclosed in JP2001-343706A, which uses the LEDs, LDs (Laser Diodes) or the like as a substitute for the conventional illumination light source, disposes the light sources, the lenses integral with the light sources, a microlens array, a condenser lens, two microlens arrays structuring the integrator, the condenser lens and the condenser lens, in this order. Accordingly, the number of components is large, and miniaturization is also restricted.

Furthermore, the projector apparatus in which the LEDs or the like are adopted as the illumination light source is provided according to the invention disclosed in JP-H10-301201A. The invention thereof utilizes the reduction optical instrument for the illumination system to improve the brightness. However, it is to be noted that an afocal system which has no focal point is shown therein for the reduction optical instrument. Accordingly, there may not be a problem when an incident light flux is parallel light, but because the actual LED light has a light distribution characteristic (divergence characteristic), it is difficult to effectively utilize non-parallel light.

SUMMARY

Therefore, the present invention has been made in view of the above circumstances, and at least one objective of the present invention is to provide a light source apparatus, an optical modulation apparatus, a display apparatus, a light condense illumination apparatus and a projection type color display apparatus, capable of effectively condensing and illuminating light irradiated from a light source relative to a predetermined range with smaller irregularity, as well as attaining miniaturization and a thinner size.

To achieve these and other advantages and in accordance with the purpose of the invention, as embodied and broadly described herein, the invention provides a light source apparatus, comprising: an array light source in which a plurality of emission light sources is arranged; a divergence characteristic controller disposed corresponding to the array light source and configured to control a divergence characteristic of each of the emission light sources of the array light source; and a focusing optical element configured to control a directivity of light emitted from each of the emission light sources of the array light source, wherein the array light source, the divergence characteristic controller, and the focusing optical element are arranged in this order in a direction of emission from the array light source, and wherein a following formula is satisfied:

$$0.067 \leq L/f < 1.1$$

where an effective diagonal length of the array light source is L and a focal distance of the focusing optical element is f.

In addition, the invention provides another light source apparatus, comprising: an array light source in which a plurality of emission light sources is arranged; a divergence characteristic controller disposed corresponding to the array light source and configured to control a divergence characteristic of each of the emission light sources of the array light source; a directivity controller configured to control a directivity of light emitted from each of the emission light sources of the array light source; and a focusing optical element, wherein the array light source, the divergence characteristic controller, the directivity controller, and the focusing optical element are arranged in this order in a direction of emission from the array light source, and wherein a following formula is satisfied:

$$0.2 \leq L/f < 2$$

where an effective diagonal length of the array light source is L and a focal distance of the focusing optical element is f.

Furthermore, the invention provides yet another light source apparatus, comprising: an array light source in which a plurality of emission light sources is arranged; a divergence characteristic controller disposed corresponding to the array light source and configured to control a divergence characteristic of each of the emission light sources of the array light source; a directivity controller configured to control a directivity of light emitted from each of the emission light sources of the array light source; and a focusing optical element, wherein the array light source, the divergence characteristic controller, the directivity controller, and the focusing optical element are arranged in this order in a direction of emission from the array light source, and wherein a following formula is satisfied:

$$0.067 \leq L/fc < 1.1$$

where an effective diagonal length of the array light source is L and a synthetic focal distance of the directivity controller and the focusing optical element is fc.

In accordance with a preferred embodiment of the invention, the array light source includes a light-emitting diode or a laser diode.

In accordance with a preferred embodiment of the invention, the directivity controller comprises at least one positive lens, or at least one plastic lens.

In accordance with a preferred embodiment of the invention, the directivity controller and the focusing optical element comprise at least one positive lens or at least one plastic lens.

Also, the invention provides an optical modulation apparatus, comprising a light source apparatus including: an array light source in which a plurality of emission light sources is arranged; a divergence characteristic controller disposed corresponding to the array light source and configured to control a divergence characteristic of each of the emission light sources of the array light source; and a focusing optical element configured to control a directivity of light emitted from each of the emission light sources of the array light source, the array light source, the divergence characteristic controller, and the focusing optical element being arranged in this order in a direction of emission from the array light source, and a following formula being satisfied:

$$0.067 \leq L/f < 1.1$$

where an effective diagonal length of the array light source being L and a focal distance of the focusing optical element being f, wherein an optical modulation element is disposed near a part in which a center of the directivity of each of the light sources of the array light source intersects with each other.

Moreover, the invention provides a display apparatus, comprising: an optical modulation apparatus; and a projection optical system, the optical modulation apparatus including a light source apparatus having: an array light source in which a plurality of emission light sources is arranged; a divergence characteristic controller disposed corresponding to the array light source and configured to control a divergence characteristic of each of the emission light sources of the array light source; and a focusing optical element configured to control a directivity of light emitted from each of the emission light sources of the array light source, the array light source, the divergence characteristic controller, and the focusing optical element being arranged in this order in a direction of emission from the array light source, a following formula being satisfied:

$$0.067 \leq L/f < 1.1$$

where an effective diagonal length of the array light source being L and a focal distance of the focusing optical element being f, and an optical modulation element being disposed near a part in which a center of the directivity of each of the light sources of the array light source intersects with each other.

In addition, the invention provides a light condense illumination apparatus, comprising: an array light source in which a plurality of emission light sources is arranged; a divergence characteristic controller disposed corresponding to the array light source and configured to control a divergence characteristic of each of the emission light sources of the array light source; and a reduction light condensing optical system in which the emission light sources and a light-condensed illuminated surface on which light emitted from each of the emission light sources is irradiated are conjugate, wherein the reduction light condensing optical system includes a light amount distribution uniformizing device configured to uniformize distribution of an amount of the light irradiated on the light-condensed illuminated surface.

In accordance with a preferred embodiment of the invention, a side of a reduction conjugation within the emission light sources and the light-condensed illuminated surface is telecentric.

In accordance with a preferred embodiment of the invention, at least one of the emission light sources is configured to change over emissions including red light, green light and blue light.

In accordance with a preferred embodiment of the invention, at least one of the emission light sources includes a light-emitting diode or a laser diode.

In accordance with a preferred embodiment of the invention, the plurality of emission light sources is disposed at uneven intervals.

In accordance with a preferred embodiment of the invention, a directivity of the light emitted from each of the emission light sources is configured to head toward an entrance pupil of the reduction light condensing optical system.

In accordance with a preferred embodiment of the invention, the emission light sources are arranged in a curved surface-like configuration which faces its concaved surface relative to the entrance pupil of the reduction light condensing optical system.

In accordance with a preferred embodiment of the invention, the light amount distribution uniformizing device comprises a microlens array, and wherein the microlens array is so disposed that a rear focal point of the microlens array substantially coincides with a vicinity of an aperture stop provided in the reduction light condensing optical system.

Moreover, the invention provides an optical modulation apparatus, comprising: a light condense illumination apparatus; and a two-dimensional spatial optical modulator disposed near a light-condensed illuminated surface of the light condense illumination apparatus, wherein the light condense illumination apparatus includes: an array light source in which a plurality of emission light sources is arranged; a divergence characteristic controller disposed corresponding to the array light source and configured to control a divergence characteristic of each of the emission light sources of the array light source; and a reduction light condensing optical system in which the emission light sources and the light-condensed illuminated surface on which light emitted from each of the emission light sources is irradiated are conjugate, and the reduction light condensing optical system includes a light amount distribution uniformizing device configured to uniformize distribution of an amount of the light irradiated on the light-condensed illuminated surface.

In accordance with a preferred embodiment of the invention, the two-dimensional spatial optical modulator includes a transmissive liquid crystal modulator, and wherein the optical modulation apparatus further comprises a polarization converter including: a separator configured to separate incident light entering the reduction light condensing optical system into a P-polarization component and an S-polarization component, and an arranging device configured to rotate one of the polarization components each separated by the separator so as to arrange that one of the polarization components into a linear polarization.

Also, the invention provides a projection type color display apparatus, comprising: an optical modulation apparatus; and a projection optical system, wherein the optical modulation apparatus includes: a light condense illumination apparatus; and a two-dimensional spatial optical modulator disposed near a light-condensed illuminated surface of the light condense illumination apparatus, the light condense illumination apparatus includes: an array light source in which a plurality of emission light sources is arranged; a divergence characteristic controller disposed corresponding to the array light source and configured to control a divergence characteristic of each of the emission light sources of the array light source; and a reduction light condensing optical system in which the emission light sources and the light-condensed illuminated surface on which light emitted from each of the emission light sources is irradiated are conjugate, the reduction light condensing optical system includes a light amount distribution uniformizing device configured to uniformize distribution of an amount of the light irradiated on the light-condensed illuminated surface, and wherein the array light source is configured to change over colors of emission at a predetermined time.

In accordance with a preferred embodiment of the invention, the reduction light condensing optical system includes a plurality of convex lenses and at least one concave lens.

Therefore, according to the light source apparatus, the optical modulation apparatus, the display apparatus, the light condense illumination apparatus and the projection type color display apparatus of the present invention, it is possible to effectively condense and illuminate the light irradiated from the light source onto the predetermined region with smaller irregularity, and to achieve the miniaturization and the thinner size of a body of the apparatus even more.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 shows an example of a light source apparatus according to an embodiment of the present invention.

FIG. 2 shows another example of the light source apparatus according to an embodiment of the present invention.

DESCRIPTION OF THE PREFERRED EMBODIMENTS

Figure 3A:
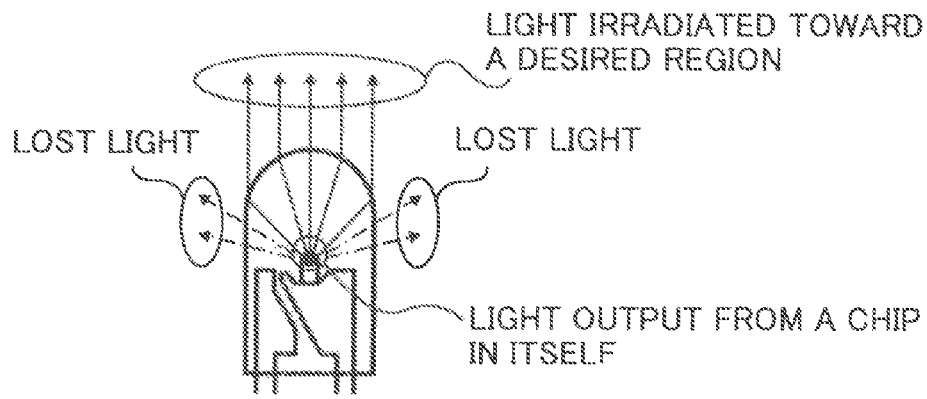
FIG. 3A to 3C each show LEDs in which a divergence characteristic (light distribution characteristic) is controlled in an array light source according to an embodiment of the present invention.

As mentioned above, LEDs, LDs or the like generate heat because an electric current flows in a light emitting part, but light radiated therefrom is monochromatic light or quasi-monochromatic light and thus an infrared ray is not included. Therefore, it is not necessary to consider the heat, radiated from a light source, with respect to a light condensing part as well, so that many of the problems which existing digital projectors have will not be caused. In addition, since an amount of emission per LED is small, the LEDs are arranged in an array to compensate the small amount of emission, and thereby a utilization area is expanded. Also, because each of the light sources is small-sized, a small and thin size still can be maintained even the array is adopted. Moreover, the emission according to the monochromatic light or the quasi-monochromatic light is possible to improve color-reproducibility and expand a range of color-reproduction. The luminous efficiency of the LEDs is in the process of being improved largely. It is thus significant to provide a blighter illumination method, an illumination apparatus and so on even when such an improvement is realized.

Reference will now be made in detail to the present preferred embodiments of a light source apparatus, an optical modulation apparatus, a display apparatus, a light condense illumination apparatus and a projection type color display apparatus of the invention, examples of which are illustrated in the accompanying drawings. The scope of the present invention, however, is not limited to these embodiments. Within the scope of the present invention, any structure and material described below can be appropriately modified.

It is to be noted that, in the preferred embodiments, a divergence characteristic (light distribution characteristic) stands for angular distribution of emission. For example in a case of the LEDs, it is known that generally the LEDs have the divergence characteristic of Lambert distribution. It is to be also noted that "directivity" in the preferred embodiments stands for a direction to which intensity of the emission becomes maximum, and is generally orthogonal to a source of emission.

FIG. 1 shows an example of a light source apparatus according to a present preferred embodiment of the invention. Referring to FIG. 1 the light source apparatus according to the present embodiment includes an array light source 11, a divergence characteristic controller 12, a directivity controller 13, a focusing optical element 14, and a surface to be illuminated (illuminated surface) 15. In the embodiment shown in FIG. 1, each lens portion, manufactured integrally with a LED chip as a light emitting part, and a micro-array lens construct the divergence characteristic controller 12 which controls the divergence characteristic of the light. In addition, the directivity controller 13 and the focusing optical element 14 are structured by at least one lens, according to the present embodiment. In one embodiment, one of the directivity controller 13 and the focusing optical element 14 is structured by at least one lens.

The light emitted from each emission light source of the array light source 11 arranged two-dimensionally is converted into a desired divergence characteristic by the divergence characteristic controller 12. Here, in a case in which high use-efficiency is necessary, it is preferable that such light be converted to be in divergent light slightly, rather than converting the light to be in parallel light, although it is not limited thereto.

In the light source apparatus according to the present embodiment, the directivity controller 13 is arranged in such a manner as to be in close to the divergence characteristic controller 12. By employing such an arrangement, it is possible to make an influence upon the divergence characteristic of the array light source 11 small, and to mainly control the directivity. In addition, it is possible to miniaturize the focusing optical element 14 by controlling the directivity to be in a side of an optical axis from a direction parallel to the optical axis.

In the light source apparatus of the present embodiment, the focusing optical element 14 is disposed away from the directivity controller 13 at a predetermined distance. The illumination is thus performed onto the illuminated surface 15 via the array light source 11, the divergence characteristic controller 12, the directivity controller 13 and the focusing optical element 14.

In an upper limit of a proportion of an effective diagonal length of the disposed array light source 11 to a focal distance of the focusing optical element 14, it is possible to make the light source apparatus to be in a compact structure. However, in the illumination light generated by the light source positioned on the periphery, in particular in the illumination light from the array light source 11 positioned vertically as shown in FIG. 1, misalignment of the illumination light is large and thus even illumination upon the illuminated surface 15 is difficult.

Therefore, in the vicinity of the upper limit of the proportion described above, the focusing optical element 14 is structured by two groups of elements of a first group having a strong focusing characteristic and a second group having the divergence characteristic, and both groups are disposed in an order of the first group and the second group from the array light source 11 at predetermined intervals. By adapting the entire arrangement of the focusing optical element 14 to be in a so-called telephoto type to provide the focusing characteristic thereto, it is possible to make the misalignment small even when the illumination light generated from the peripheral light source is irradiated from the vertical position. Hence, it is possible to achieve a balance between compactification of the light source apparatus and uniformity of the illumination light.

On the other hand, in a lower limit of the proportion, it is easy to compensate the uniformity of the illumination light well, but the compactification of the light source apparatus becomes difficult even if arrangement of power in the focusing optical element 14 is well considered. Accordingly, the light source apparatus according to the present embodiment achieves stabilization of the amount of emission by, for example, utilizing a material having good heat conductivity, providing a heat sink, etc. for a mounting substrate, a back surface thereof and so on.

A range of the proportion of the effective diagonal length "L" of the disposed array light source 11 to the focal distance of the focusing optical element 14 "f", and a range of a proportion of the effective diagonal length "L" of the array light source 11 to a synthetic focal distance "fc" of the directivity controller 13 and a light condensing controller (the light focusing optical element 14 in the present embodiment), indicate a range in which the balancing of the compactification of the light source apparatus and the uniformity of the illumination light is possible to be achieved. In particular, such a range defines a relationship of the array light source 11, the directivity controller 13 and the light focusing light element 14.

The directivity controller 13 plays a role in assisting an action, performed by the light focusing optical element 14 as a role thereof, of collecting the light emitted from each of the emission light sources of the array light source 11 onto the illuminated surface 15. Therefore, it is most desirable that the relationship of the above-described "L" and "f" be in a range represented by a formula (1) below, and that the relationship of the "L" and "fc" be in a range of a formula (2) below.

$$0.2 \leq L/f < 2 \tag{1}$$

$$0.067 \leq L/fc < 1.1 \tag{2}$$

FIG. 2 shows another example of the light source apparatus according to an embodiment of the present invention. FIG. 2 shows a case in which the directivity controller 13 is not used. The light source apparatus of the present embodiment includes the array light source 11, the divergence characteristic controller 12, a light focusing optical element 141, and the illuminated surface 15. The light focusing optical element 141 has a function of the directivity controller 13 shown in FIG. 1, i.e. has the function of controlling the directivity of the light.

As described above, the amount of emission per LED is small. However, in the recent years, development of high-intensity LEDs has been promoted rapidly for use in a backlight of a large-screen display, a front light of a vehicle, indoor lighting, and so on. A policy of the development of the high-intensity LEDs is, rather than to use a plurality of LEDs to structure a bright light source, to improve brightness of a single LED and to use such brightness-improved LEDs with a small amount to provide the bright light source. When a small number of LEDs is used and the bright light source is thereby constructed, it is possible to make an optical system to have a further simplified structure.

More specifically, in the light sources of the array light source 11 of the above embodiment shown in FIG. 1, the directivity controller 13 is used to suppress broadening (or divergence) of the light from the divergence characteristic controller 12 onward, so as to prevent an enlargement of a caliber of the light focusing optical element 14. However, it is possible to control the directivity alone by the light focusing optical element 14 when the effective diagonal length "L" of the array light source 11 is made small. Thereby, the illumination is possible without enlarging the caliber of the light focusing optical element 14.

According to the structure of the present embodiment, it is possible to make the light source apparatus to be in the compact structure in the upper limit of the proportion of the effective diagonal length "L" of the array light source 11 to the focal distance of the focusing optical element 14 "f", but the illumination light emitted from the light source located on the periphery is misaligned largely. As compared with the above-described embodiment shown in FIG. 1, the effective diagonal length "L" of the present embodiment is smaller, but when the above-described embodiment and the present embodiment are compared in terms of the structure thereof, a capacity of compensation for the misalignment is deteriorated since there is no assist by the directivity controller 13 and thus the illumination is carried out by the light focusing optical element 14 alone. In addition, in the lower limit of the proportion, it is easy to compensate the uniformity of the illumination light well, but the compactification of the light source apparatus becomes difficult.

Therefore, in the present embodiment, it is most desirable that a range of a relationship of the proportion of the effective diagonal length "L" of the array light source 11 to the focal distance of the focusing optical element 14 "f" be in a range represented by a formula (3) below, when the directivity is to be controlled by the structure of the embodiment shown in FIG. 2.

$$0.067 \leq L/f < 1.1 \tag{3}$$

Figure 3B:
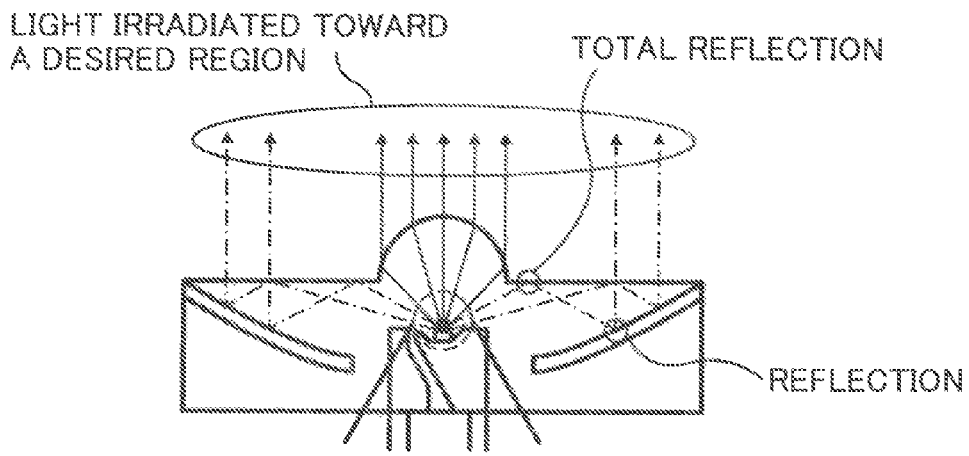
Figure 3C:
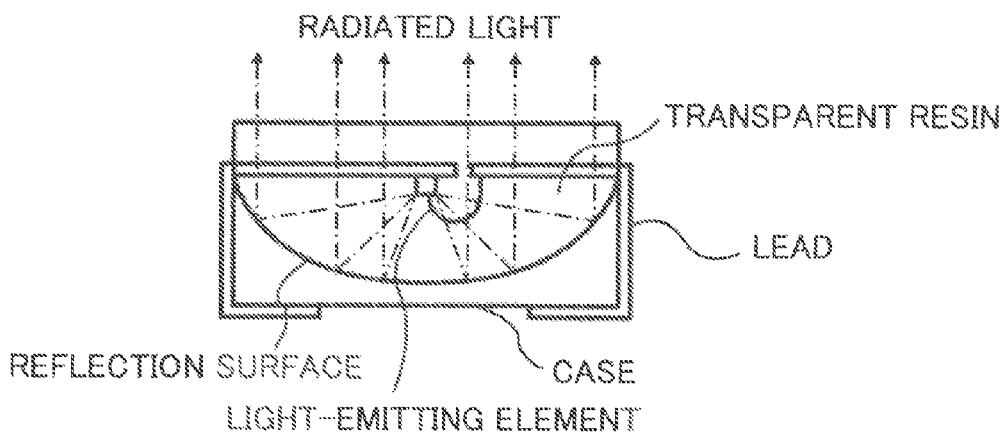

In addition, an LED array, an LD array or the like can be used for the array light source 11 in the light source apparatus according to the present embodiment of the invention. In the alley light source 11 of the embodiment of the invention, illumination of the LEDs in which a half-power angle relative to intensity distribution is ±60 degrees is realized, and the divergence characteristic controller 12 is integrated with the LEDs. Generally, the LEDs of a shell-type as shown in FIG. 3A (half-power angle is ±30 degrees), a DR (Double Reflection) type as shown in FIG. 3B (half-power angle is ±10 degrees), and a surface implementation type as shown in FIG. 3C (half-power angle is ±7 degrees) for example are known and can be used thereto. In the embodiments shown in FIGS. 1 and 2, the shell type LED shown in FIG. 3A and a corresponding microlens are used to control the divergence characteristic.

In the emission of the LD, because there is an orientation in an azimuth of the divergence characteristic (divergence in a direction parallel to a traveling direction of light), it is effective to use a cylindrical lens, an anamorphic lens or the like to cope with such an orientation in the azimuth.

Also, since each of the light sources of the array light source 11 has an emission wavelength substantially same to each other, it is also possible to allow the light source apparatus according to the embodiment of the invention to emit monochromatic light. In addition, variations are generally large in the LEDs from lot to lot or from batch to batch. Hence, sorting or the like may be performed to arrange the emission wavelength of each of the light sources of the array light source, such that the light emitted from the light source apparatus is brought even close to the monochromatic light.

On the other hand, it is possible to allow at least one of the light sources of the array light source 11 to have a plurality of luminescence sources in which the emission wavelength is different. For example, when three luminescence sources of R, G and B described above is arranged to be in close to each other so as to structure a single light source, it is possible to provide the light source apparatus which presents a color picture by sequentially lighting the above described R, G, and B for example.

In the light source apparatus according to the present embodiment, the directivity controller 13 and the focusing optical element 14 are structured by at least one lens, as mentioned above. In the present embodiment, at least one of the lenses of the directivity controller 13 and the focusing optical element 14 is a positive lens or a plastic lens. In one embodiment, at least one of the lenses of the directivity controller 13 or the focusing optical element 14 is a positive lens or a plastic lens. As mentioned is the foregoing, the light radiated from the LEDs and the LDs does not include the infrared light.

Therefore, since there is no generation of heat due to the light, use of the plastic lens near the array light source 11 is possible. The plastic lens is easily manufactured by molding, thus reduction of costs can be achieved. In addition, a lens having an aspheric surface, a particular surface or the like can also be relatively easily mass-produced. Furthermore, it is possible to improve uniformity of the manufactured lens, and to easily achieve weight-saving of the apparatus as compared with a case in which a glass lens is used.

Additionally, in the present embodiment, it is also possible to employ at least one of the lenses applied to the above-described directivity controller 13 and the focusing optical element 14 as a Fresnel lens. In one embodiment, at least one of the lenses of the directivity controller 13 or the focusing optical element 14 is a Fresnel lens. In particular, it is highly advantageous when the Fresnel lens is used for the focusing optical element 14. Generally, when a lens is used for a focusing optical element, it is more likely that a central thickness of the lens becomes large. On the contrary, when the Fresnel lens is used for the focusing optical element 14 as in the present embodiment, it is possible to achieve a thinner size and weight reduction, and further to reduce a color difference in the illumination light from each of the light sources in conjunction with a diffracting plane thereof.

It is also possible to carry out control in which the directivity of each of the light sources of the array light source 11 is further condensed on a central part of the illuminated surface 15, by utilizing a two-dimensional array of minute prisms for the divergence characteristic controller 12, in association with the above-described focusing optical element 14. In addition, this will also lead to the thinner size of the light source apparatus, and it can be formed easily by a plastic.

According to the present embodiment, it is possible to realize the optical modulation apparatus, by utilizing the light source apparatus described above and disposing an optical modulation element near a position where a center of the directivity of each of the light sources of the array light source intersects with each other. Here, both of the transmissive optical modulation element and the reflective optical modulation element can be applied to the optical modulation apparatus.

In the optical modulation apparatus, a two-dimensional array (microlens array) of microlenses corresponding one-to-one to each pixel of the optical modulation element is disposed at a side of the light source apparatus near the optical modulation element. Thereby, it is possible to efficiently perform light-condensing on an effective portion of the optical modulation element, and hence, use-efficiency of the illumination light is increased. Practically, in one embodiment, a conventionally-used polarization converting element is disposed between the microlens array and the optical modulation element to improve the light-use-efficiency furthermore.

The microlenses in the two-dimensional array (microlens array) are arranged at even intervals. An arrangement pitch of the microlenses is slightly larger than an arrangement pitch of the pixels of the optical modulation element, and is so set that the arrangement pitch of the microlenses in a center part of the microlens array substantially coincides with the arrangement pitch of the pixels of the optical modulation element, and that the arrangement pitch of the microlenses is substantially misaligned to the arrangement pitch of the pixels of the optical modulation element as going from the center part of the microlens array to a peripheral part thereof. It is most preferable that the transmissive optical modulation element be used for the optical modulation element, and thereby, it is possible to change the directivity of a modulated light flux projected from each element of the optical modulation element such that the light fluxes thereof are focused on a specific position from a vertical direction relative to a disposed surface of the optical modulation element.

Furthermore, according to the present embodiment, it is also possible to provide a display apparatus in which a projection optical system is disposed by utilizing the above-described optical modulation apparatus. In one embodiment, the optical modulation apparatus in which the light sources of R, G and B are used one-by-one is provided to the above-described light source apparatus, in which the emission wavelength of each of the light sources is substantially the same to each other, and each of the illumination lights from the optical modulation apparatus are synthesized with a dichroic mirror or the like. Thereby, it is possible to provide the color display apparatus of a three-plate type capable of displaying a bright and high-quality image.

In addition, as other embodiment, it is possible to provide the color display apparatus of a single-plate type, by utilizing the light source apparatus having the plurality of light sources in which the emission wavelength is different from each other, and by sequentially irradiating the illumination light from each of the light sources of R, G and B to the optical modulation apparatus at certain time intervals. Therefore, it is possible to achieve miniaturization and weight-waving of the display apparatus, and also to make a size of the display apparatus to be in a handy-size or a portable-size. Furthermore, high telecentric, required in an ordinary projection lens, is not necessary, and thus it is possible to allow designing of the projection lens advantageous.

Hereinafter, an embodiment of the display apparatus of the invention will be described with reference to FIGS. 4 and 5.

Figure 4:
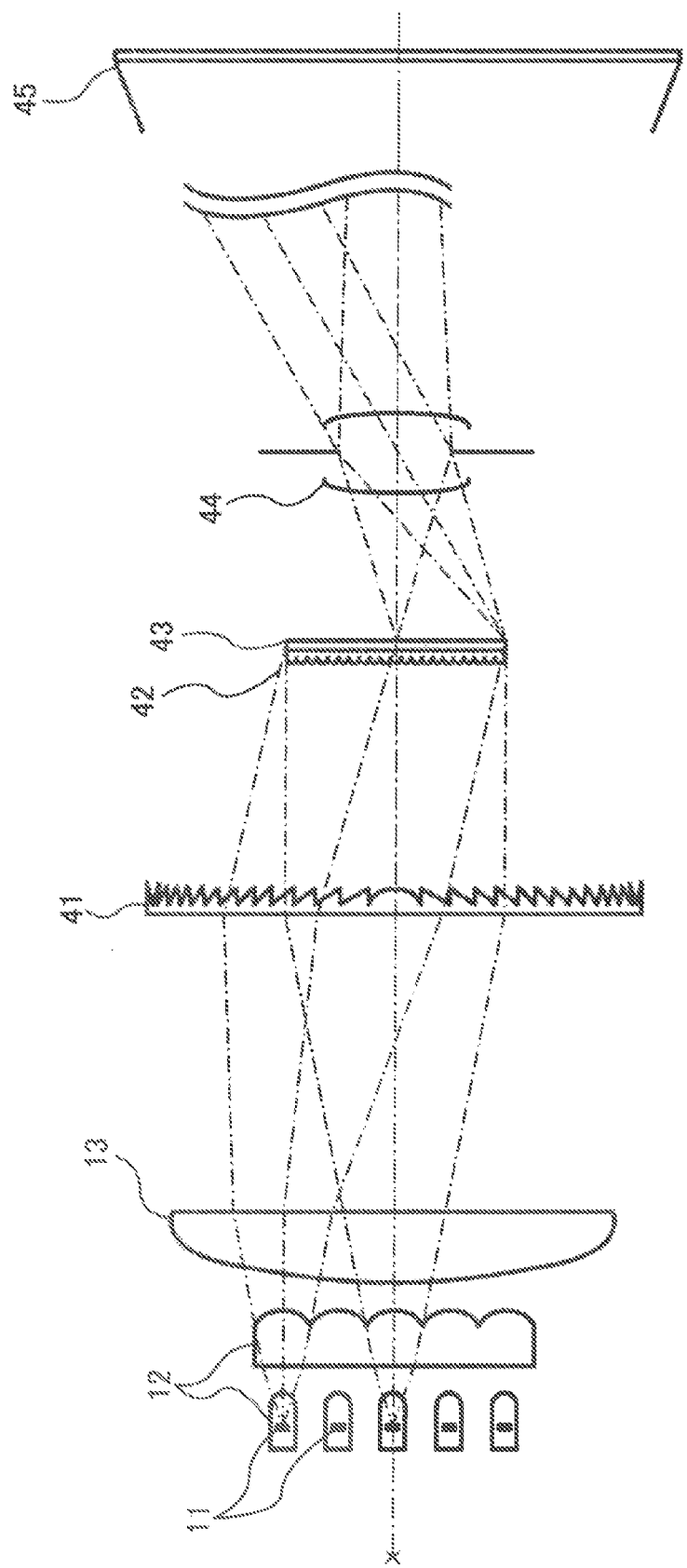
FIG. 4 shows a case in which a transmissive optical modulation apparatus of a single-plate type is used in a display apparatus according to an embodiment of the present invention.

FIG. 4 shows a display apparatus in which a transmissive optical modulation apparatus of a single-plate type is used according to an embodiment of the present invention. In this embodiment, a Fresnel lens 41 is used as the focusing optical element. Referring to FIG. 4, the Fresnel lens 41, a microlens array 42, a transmissive type optical modulation element 43, a projection lens 44, and a displayed surface 45 are arranged in this order from a side of the array light source 11 to the displayed surface, wherein the microlens array 42 corresponds to the number of elements of the optical modulation element 43. Chips which emit the light of R, G and B respectively are arranged to each of the light sources of the array light source 11, and are sequentially lit at certain time intervals. The optical modulation element 43 is turned on and off according the sequential lighting of the chips, and an image of the optical modulation element 43 is projected through the projection lens 44 onto the displayed surface 45. Thereby, the high-quality color image is displayed on the displayed surface 45.

Figure 5:
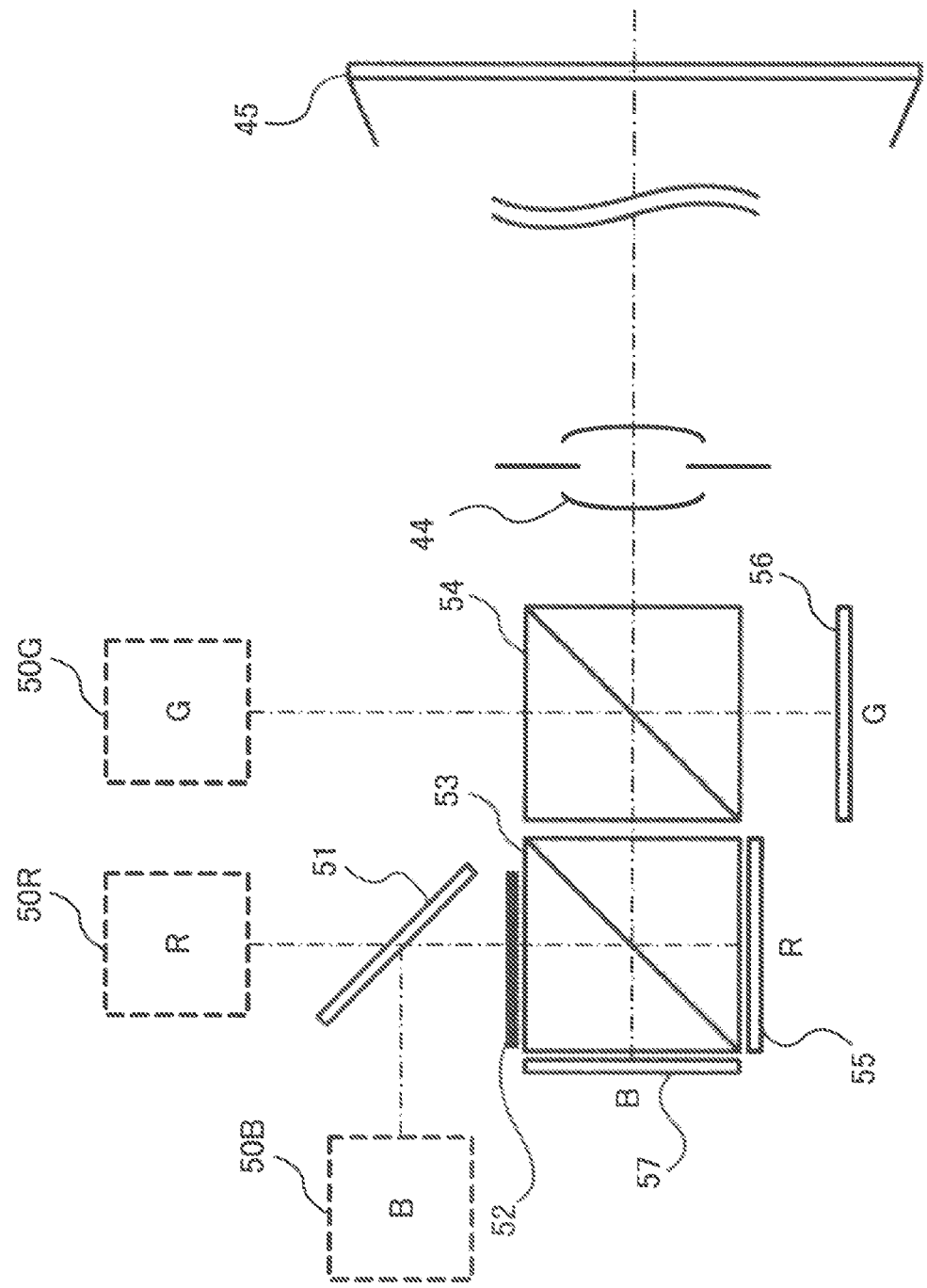
FIG. 5 shows a case in which a transmissive optical modulation apparatus of a three-plate type is used in the display apparatus according to an embodiment of the present invention.

FIG. 5 shows a display apparatus in which a transmissive optical modulation apparatus of a three-plate type is used according to an embodiment of the present invention. In this embodiment, the light irradiation is carried out from the light source apparatuses (50R, 50B, 50G) of monochromatic light having the emission light sources corresponding to the colors of R, G and B, respectively. The display apparatus according to the present embodiment includes a dichroic mirror 51, a retardation film 52 of a laminated type, polarization beam splitters 53, 54, an optical modulation element for R (red) 55, an optical modulation element for G (green) 56, and an optical modulation element for B (Blue) 57.

The optical modulation element for R 55, the optical modulation element for G 56 and the optical modulation element for B 57 are arranged in such a manner that an irradiated part (displayed surface 45) corresponds to each of the optical modulation elements 55, 56 and 57. When the light is irradiated from each of the light source apparatuses of respective colors, each light thereof is polarized in a same polarizing direction (for example, S-polarization). The laminated retardation film 52 has a property of converting only the polarizing direction of the light of B (blue). Hence, since the light of three colors incident on the projection lens 44 are respectively in the same polarizing direction, it is possible to minimize a loss of light by the light irradiation.

Here, it is to be noted that the present embodiment has been explained by referring to a case in which the optical modulation apparatus of an area type is used, but the present invention is possible to be similarly applied to a display apparatus which uses an optical modulation apparatus of a linear type and performs scanning in a direction perpendicular to a projected image of the linear type optical modulation apparatus.

Now, the light condense illumination apparatus according to an embodiment of the invention will be described with reference to FIGS. 6 to 10.

The light condense illumination apparatus according to the present embodiment is possible to carry out reduction image formation, by utilizing a reduction light condensing optical system having a conjugation relation in which the emission light sources are set as an object and a light-condensed illuminated surface is set as an image plane. Thereby, in principle, it is possible to make brightness of the light-condensed illuminated surface brighter according to reciprocal times of square of a reduction rate. In the emission of the ordinary LEDs and the light source of the type which controls the divergence characteristic as described above for example, the directivity (the direction to which the intensity of the emission becomes the maximum) thereof is in a direction orthogonal to a surface of the emission. In such a case, it is preferable that a side of an enlargement conjugation in the reduction light condensing optical system be telecentric. In addition, it is preferable that a side of a reduction conjugation in the reduction light condensing optical system be also the telecentric.

Figure 6:
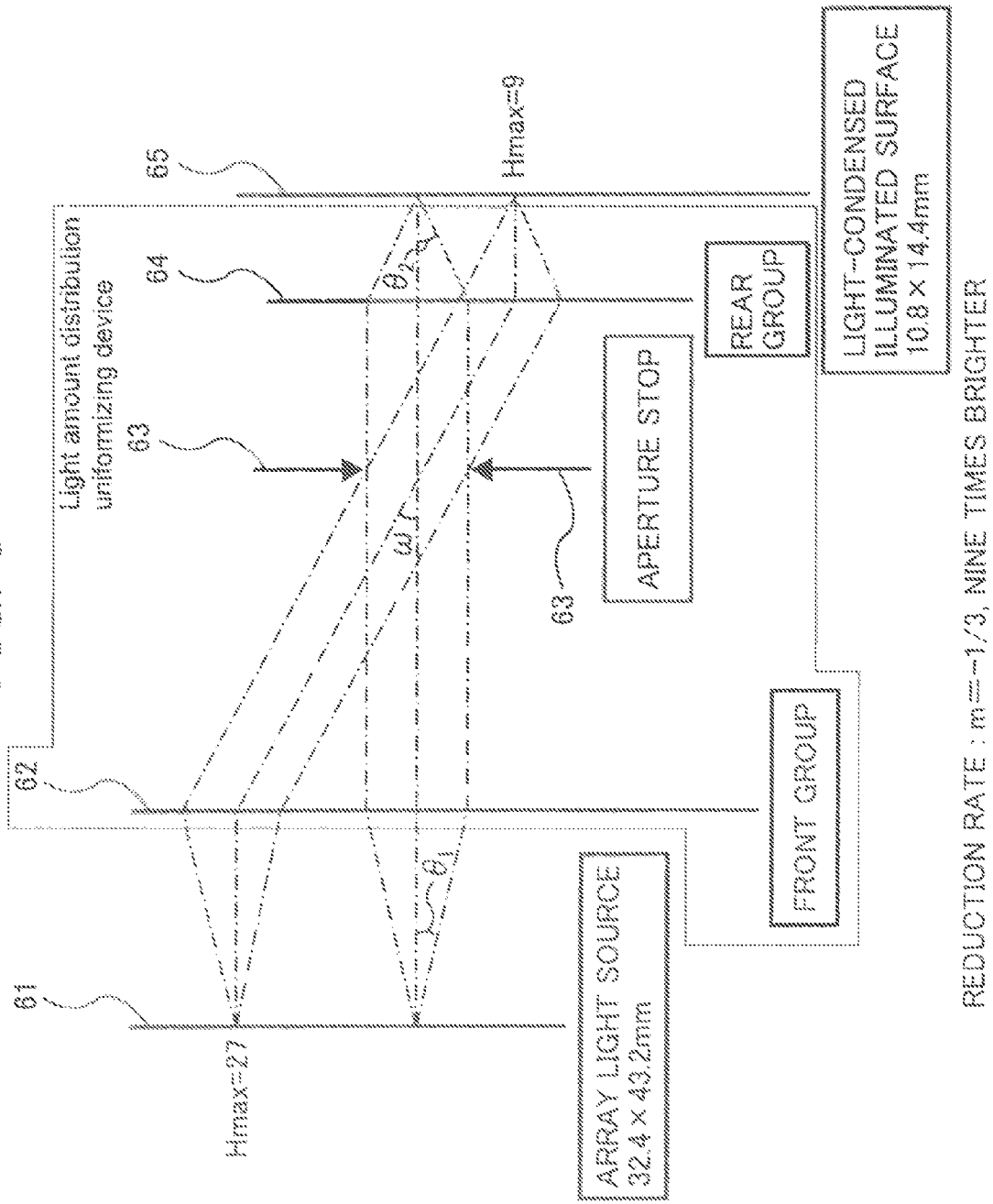
FIG. 6 shows an example of a reduction light condensing optical system, in which both sides thereof are telecentric, in a light condense illumination apparatus according to an embodiment of the present invention.

Now, referring to FIG. 6, according to the present embodiment, an array light source 61, arranged such that one side thereof has the area three times larger than a light-condensed illuminated surface 65, is used to reduce the area of the array light source 61 so that the illumination light from the alley light source 61 is irradiated relative to the light-condensed illuminated surface 65 in a size of one-third of the array light source 61 (for example, the area of the array light source 61 is 32.4 mm×43.2 mm, and the light-condensed illuminated surface 65 is 10.8 mm×14.4 mm, although it is not limited thereto). According to the present embodiment, in a case in which a size of a single LED of the surface implementation type is set as 5.4 mm angle, it is possible to arrange 6×8 surface implementation type LEDs for the array light source 61, and in principle, nine times brightness is thereby obtained.

In the reduction light condensing optical system according to the present embodiment of the invention, both sides thereof are telecentric. The reduction light condensing optical system includes a front group of optical components 62, an aperture stop 63, and a rear group of optical components 64. The array light source 61 structured by the LEDs of the surface implementation type is arranged in a focal position behind the front group of optical components 62. In order to have both sides of the reduction light condensing optical system according to the present embodiment to be telecentric, a front side focal point of the front group of optical components 62, the aperture stop 63 and a rear side focal point of the front group of optical components 64 are disposed to coincide with each other.

In the present embodiment, a focal distance of the front group of optical components 62 and a focal distance of the rear group of optical components 64 are so set that $f2/f1=1/3$ is satisfied, where the focal distance of the front group of optical components 62 is $f1$, and the rear group of optical components 64 is $f2$. Accordingly, a distance in an opposite angle direction is 2 ×27 in a light source side and 2×9 in the irradiated surface, and $f1=58$ mm and $f2=19.3$ mm are obtained when a field angle $\omega=25$ degrees. Also, in a case in which the LEDs are in the surface implementation type as in the present embodiment, a half-power angle thereof is ±7 degrees, and thus $\theta 1=7$ degrees and $\theta 2=21$ degrees are established in FIG. 6.

Hence, because the reduction light condensing optical system uniformizes light amount distribution of the illumination light irradiated on the light-condensed illuminated surface according to the light condense illumination apparatus of the embodiment of the invention, it is possible to provide the light condense illumination apparatus capable of irradiating a bright and sharp picture even with an amount of emission of the LEDs or the like.

Also, according to the light condense illumination apparatus of the present embodiment, it is also possible to change over the emissions of the plurality of emission light sources, for example, from R (red) to G (green), from G to B (blue) and so on, respectively, by utilizing the LEDs or the like as in the case of above described embodiment. In addition, it is further possible to change the colors of emission relative to the light-condensed illuminated surface at a predetermined time intervals, and to generate an intermediate color without allowing the time of the emission of the three colors to be the same with each other.

The plurality of emission light sources is disposed at uneven intervals. Normally, it is likely that an amount of light is reduced in a peripheral part of the optical component in the front group due to an eclipse and so on, even when both sides of the reduction light condensing optical system are telecentric. However, it is possible to uniformize distribution of light on the illuminated surface by more densely arranging the emission light sources of the array light source 61 in a peripheral part of the array light source 61 as going from a center part toward the peripheral part of the array light source 61, as in the present embodiment. On the other hand, it is also possible to arrange the center part of the array light source 61 more dense as going from the peripheral part to the center part of the array light source 61, so as to carry out control of the light amount distribution.

Also, each of the directivities of the plural emission light sources of the array light source 61 are set to head toward an entrance pupil of the reduction light condensing optical system. In an arrangement of the emission light sources, a facing direction of the directivity of each of the emission light sources is changed on a plane. By employing such setting of the directivities of the plurality of emission light sources, for example, it is possible to eliminate or cancel the telecentric in the light source side (the enlargement conjugation side) as in FIG. 7 which will be described later. Furthermore, it is also possible to reduce a size of the front group of optical components which are adapted to be in large-size in FIG. 6, or to utilize a reduction light condensing optical system which is based on a completely different design concept.

Figure 7:
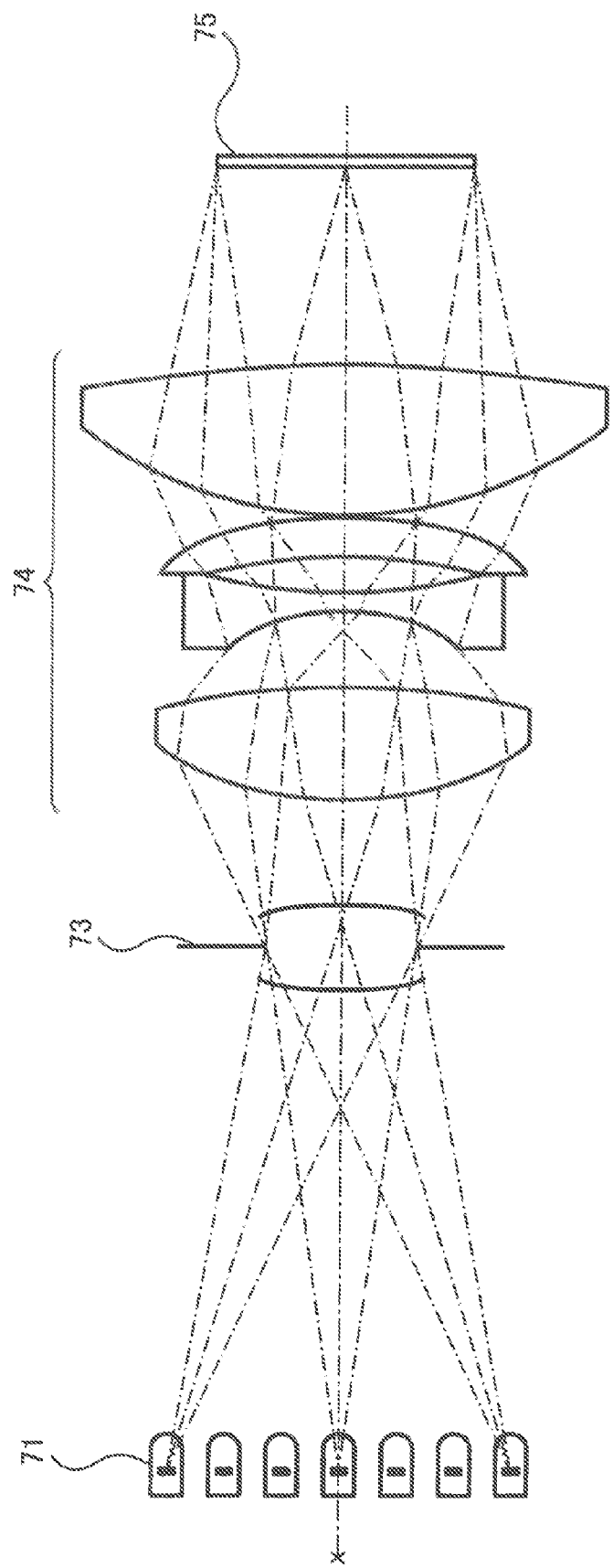
FIG. 7 shows an example of the reduction light condensing optical system, in which a side of a reduction conjugation thereof is telecentric, in the light condense illumination apparatus according to an embodiment of the present invention.

FIG. 7 shows a case in which the reduction light condensing optical system is structured only by four lenses having an aperture stop 73 at a front side thereof, so as to remove the front group of optical components and leave a rear group 74 only, i.e. a case in which the enlargement conjugation side is removed, according to an embodiment of the invention. In this embodiment, only the reduction conjugation side is telecentric, and the reduction rate=$-\frac{1}{2}$ and $\omega=20$ degrees are obtained.

The directivity (a facing direction of a principal ray) of each of the light sources of the array light source 71 is set to face and head toward the entrance pupil of the reduction light condensing optical system as described above. Hence, it is possible to perform and achieve the uniform distribution of the light amount. In addition, because the LEDs or the like are used for the light sources, the light emitted therefrom does not include the infrared ray and does not radiate a heat ray. Therefore, use of the plastic lens is possible, and cost increase can be suppressed even when an aspheric surface is used.

According to one embodiment with reference to FIG. 7, an aperture diameter of the aperture stop 73 and a focal distance from the aperture stop 73 to a light-condensed illuminated surface 75 are so set that an F-number (an index representing a capacity of a lens system to introduce the light therein) becomes 2.0. In such an embodiment, fine performance with regard to a distortion aberration, a chromatic aberration and so on is obtained, and an aperture efficiency of 100% is obtained even in a most peripheral part of the lens of the rear group 74, even in a case in which a lens having the aspheric surface is employed. In addition, it is possible to minimize an uneven light amount, an irregular color and so as well.

Also, when the aperture diameter of the aperture stop 73 and the focal distance from the aperture stop 73 to the light-condensed illuminated surface 75 are set so that the F-number=2.0 is established, a distance from the aperture stop 73 to the light-condensed illuminated surface 75/f2=44 and maximum effective diameter/f2=1.1 are obtained. Therefore, it is possible to greatly reduce a size of the light condense illumination apparatus even when comparing with the case in which both sides of the reduction light condensing optical system are telecentric.

Moreover, it is possible to obtain the above-described advantageous effects easily and furthermore by arranging the light sources of the array light source in a curved surface-like configuration, facing its concaved surface toward the entrance pupil of the reduction light condensing optical system, as seen from the entrance pupil thereof.

Furthermore, according to an embodiment of the invention, it is possible to utilize a microlens array as a device which uniformize the light amount distribution of the light-condensed illuminated surface, which will be described hereinafter with reference to FIG. 8.

Figure 8:
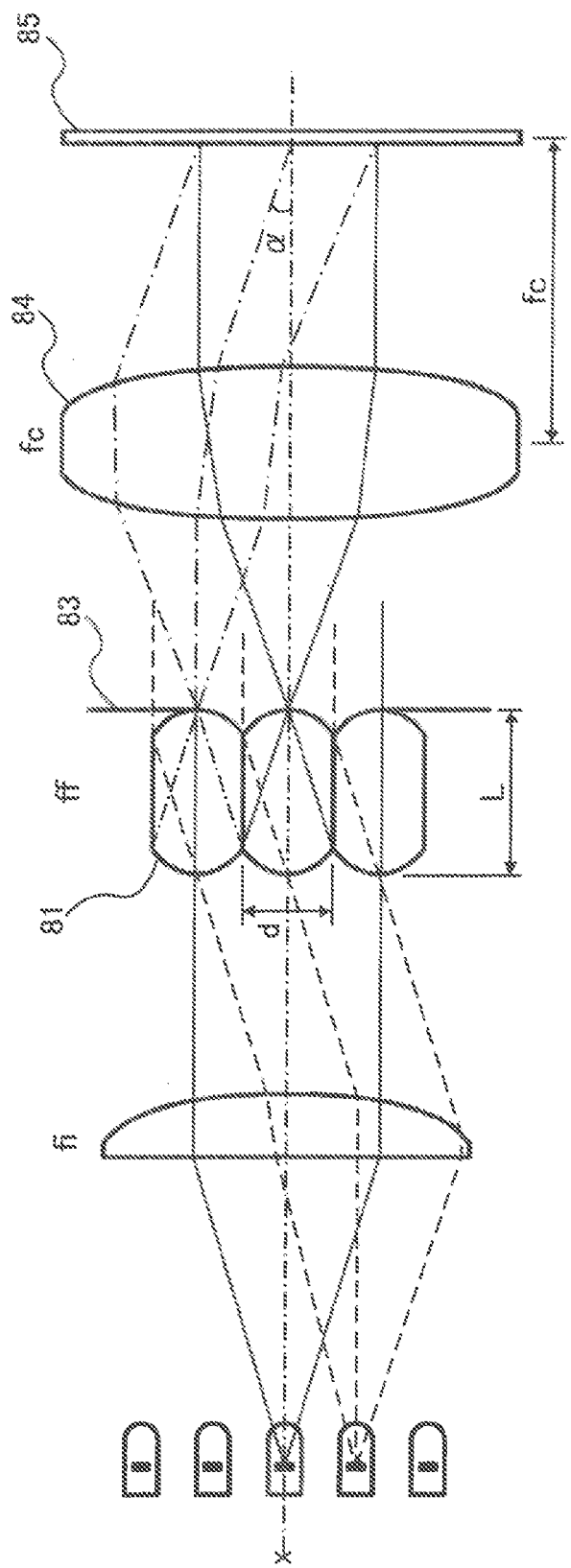
FIG. 8 shows an example of a case in which a light amount distribution is made even by utilizing a microlens array in the light condense illumination apparatus according to an embodiment of the present invention.

FIG. 8 shows an example of a case in which the microlens array is used as the device for uniformizing the light amount distribution in the light condense illumination apparatus according to an embodiment of the present invention. Referring to FIG. 8, a microlens array 81 is disposed in such a manner that a rear side focal point of the microlens array 81 substantially coincides with a vicinity of an aperture stop 83 within the reduction light condensing optical system, i.e. substantially coincides with a rear side focal position of the reduction light condensing optical system. A condenser lens 84 serves as the reduction light condensing optical system in the present embodiment. Accordingly, optical images of the array light source are adapted to be overlapped finally on an illuminated surface 85 through each microlens opening (pitch) "d" of the microlens array 81, and thereby the uneven light amount is reduced.

In the present embodiment, both sides of each microlens of the microlens array 81 have a convex configuration as shown in FIG. 8. However, in one embodiment, a lens having an aspheric surface on its both side surfaces each formed in plano-convex configuration is possible to be used for the microlens of the microlens array 81. The microlens can be manufactured in a thin plate-like shape, so that miniaturization of the apparatus is achieved.

Furthermore, it is also possible to provide the optical modulation apparatus in which a two-dimensional spatial optical modulator is disposed near the illuminated surface, by using the light condense illumination apparatus according to the embodiment of the invention. The light condense illumination apparatus according to the embodiment of the invention is applicable to the optical modulation apparatus of a non self-luminous type, and is possible to be used in various optical modulation apparatuses such as a transmissive type, a reflective type, a diffractive type and so on. Because the illumination part of the light condense illumination apparatus according to the embodiment of the invention is small-sized, it is possible to miniaturize the optical modulation apparatus.

Figure 9:
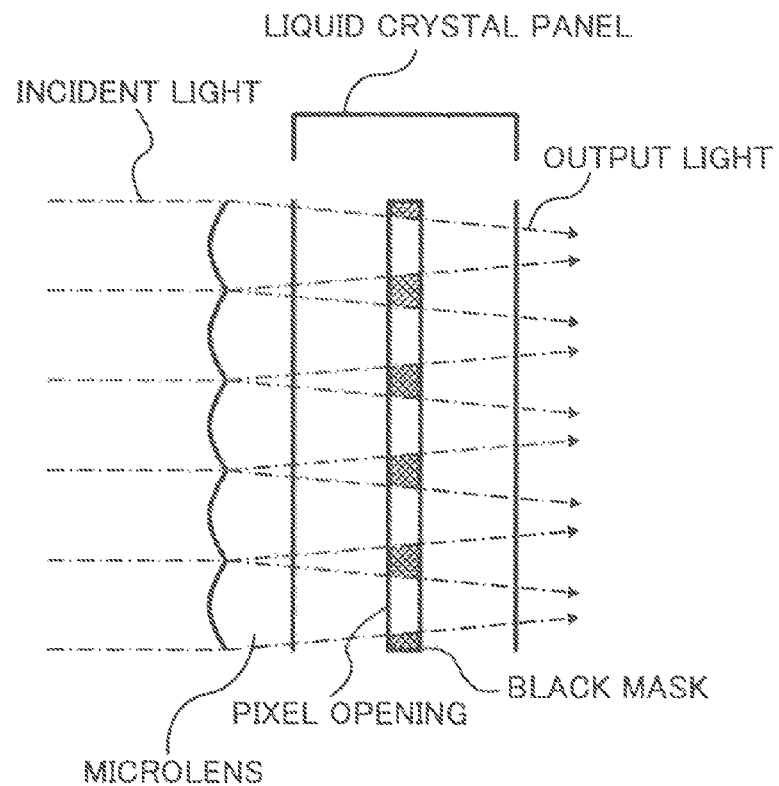
FIG. 9 schematically shows an increase in an aperture ratio by the microlens array in the light condense illumination apparatus according to an embodiment of the present invention.

In addition, in the optical modulation apparatus, a two-dimensional array of microlenses corresponding one-to-one to each pixel of an optical modulation element is disposed on a side of the array light source in proximity to the two-dimensional spatial optical modulator. Thereby, it is possible to optically improve an aperture ratio of the optical modulation element. As shown in FIG. 9, because incident light passes an opening of each pixel without being influenced by the eclipse, the use-efficiency is increased. Hence, it is possible to provide the blight optical modulation apparatus.

Also, in the optical modulation apparatus according to the present embodiment, the two-dimensional spatial optical modulator disposed in the proximity of the illuminated surface is a transmissive liquid crystal modulator. In addition, the optical modulation apparatus of the embodiment arranges a polarization converter, which separates the light from each of the plurality of emission light sources into a P-polarization component and an S-polarization component and arranges one of the polarization component into a linear polarization by rotating that one of the polarization component, in an optical path of the reduction light condensing optical system.

Figure 10:
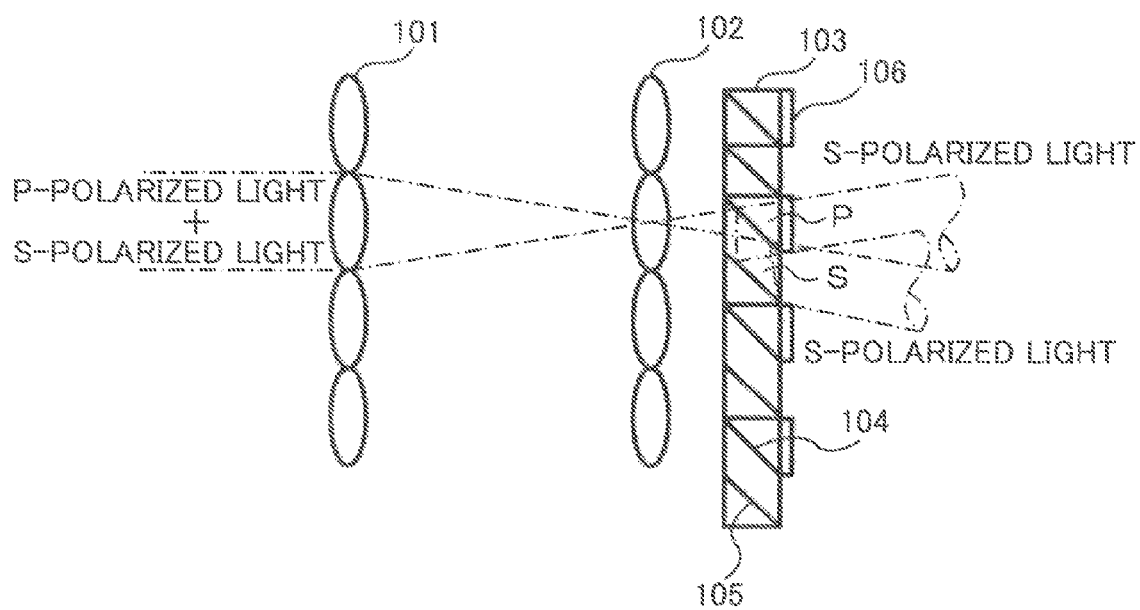
FIG. 10 shows an example of a polarization converter in the light condense illumination apparatus according to an embodiment of the present invention.

FIG. 10 shows a structure of the polarization converter in a case in which a size of the polarization converter is thinned according to an embodiment of the invention. Referring to FIG. 10, the polarization converter according to the present embodiment includes a first microlens array 101, a second microlens array 102, a polarization converting element 103, a polarization split film 104, a mirror surface 105, and a phase plate 106.

The irradiation light emitted from the LEDs is in a random polarization state capable of polarizing into either P-polarized light or S-polarized light. When the irradiation light is incident on the first microlens array 101, the incident light is guided to and condensed on the second microlens array 102, and then enters the polarization converting element 103. As a result, the light entered into the polarization converting element 103 is split into the P-polarized light and the S-polarized light.

The P-polarized light transmits the polarization split film 104 directly. A polarization direction of the transmitted P-polarized light is rotated at an angle of 90 degrees by the phase plate 106, and then the rotated polarized light exits as the S-polarized light. On the other hand, the S-polarized light split by the polarization converting element 103 is reflected by the polarization split film 104, then reflected by the mirror surface 105 as well, and thereafter, exits from the polarization converting element 103, remaining as the S-polarized light. In one embodiment, the microlens array 81 explained above with reference to FIG. 8 is used as the first microlens array 101.

Accordingly, it is possible to provide the optical modulation apparatus having good light efficiency, by utilizing the liquid crystal modulator which modulates the polarization state in such a manner described above.

In addition, it is possible to provide the projection type color display apparatus by using the optical modulation apparatus according to the embodiment of the invention described above, a projection optical system and the array light source which is possible to change over the colors of the emission at a predetermined time.

In a conventional projection type color display apparatus of a single-plate type, there has been an issue in display colors of R, G and B as the light's three primary colors. However, since the projection type color display apparatus according to the embodiment of the invention is possible to time-sequentially change over the time of the emission, it is possible to carry out blight color-displaying even when the projection type color display apparatus is in the single-plate type. Here, it is to be noted that the emission time of the three colors of R, G and B does not necessarily have to be at even intervals. The emission time is suitably changed and decided according to reproduction of the display colors for the color-displaying.

In the projection type color display apparatus, in one embodiment, a cylindrical microlens array is used to uniformize distribution of an amount of light on a light-condensed surface. The array light source performs the emission of each of the plurality of colors at the predetermined time in a long-side direction or relative to a longitudinal direction of the cylindrical microlens array (i.e. performs the emission in a direction perpendicular to an irradiation surface). Hence, color-flickering is reduced.

In an actual operation, in one embodiment, displaying in the transmissive liquid crystal modulator is divided into three parts (in one embodiment, divided into integral multiplication of three) in a short-side direction thereof (in other words, in a direction parallel to the irradiation surface), and the displaying of R, G and B is performed at first in that order at the predetermined time intervals. Then, at the time of the next displaying time, color-scanning is performed in an order of G, B and R to carry out the color-displaying.

In such a case, it is necessary that there is less irregular color and a single color be present in the long-side direction as well as the colors be separated in the short-side direction relative to the liquid crystal modulator. However, when the light condense illumination apparatus, the optical modulation apparatus of the embodiments described above are used, a function of reducing the irregular color is removed with respect to the long-side direction (the light amount distribution is not uniformized), and thereby the color-displaying by the color-scanning is possible to be carried out. Because the even irradiation of the light in the long-side direction and the illumination in which the three-primary colors are separated in the short-side direction of the liquid crystal modulator are possible relative to the liquid crystal modulator, the color-flickering is reduced.

According to an embodiment of the projection type color display apparatus, it is preferable that the reduction light condensing optical system be structured by a plurality of convex lenses and at least one concave lens. The plurality of convex lenses is used for carrying out the reduction image formation for example, whereas the at least one concave lens is used for performing the color separation in the direction parallel to the irradiation surface for example. In particular, the above-mentioned at least one concave lens is extremely important for reducing the chromatic aberration of a magnification, and it is more preferable that such a concave lens be a concave lens having a relatively small Abbe number. This enables use of an aspheric surface on a lens, and hence, it is also effective in terms of miniaturization of the apparatus.

Figure 11:
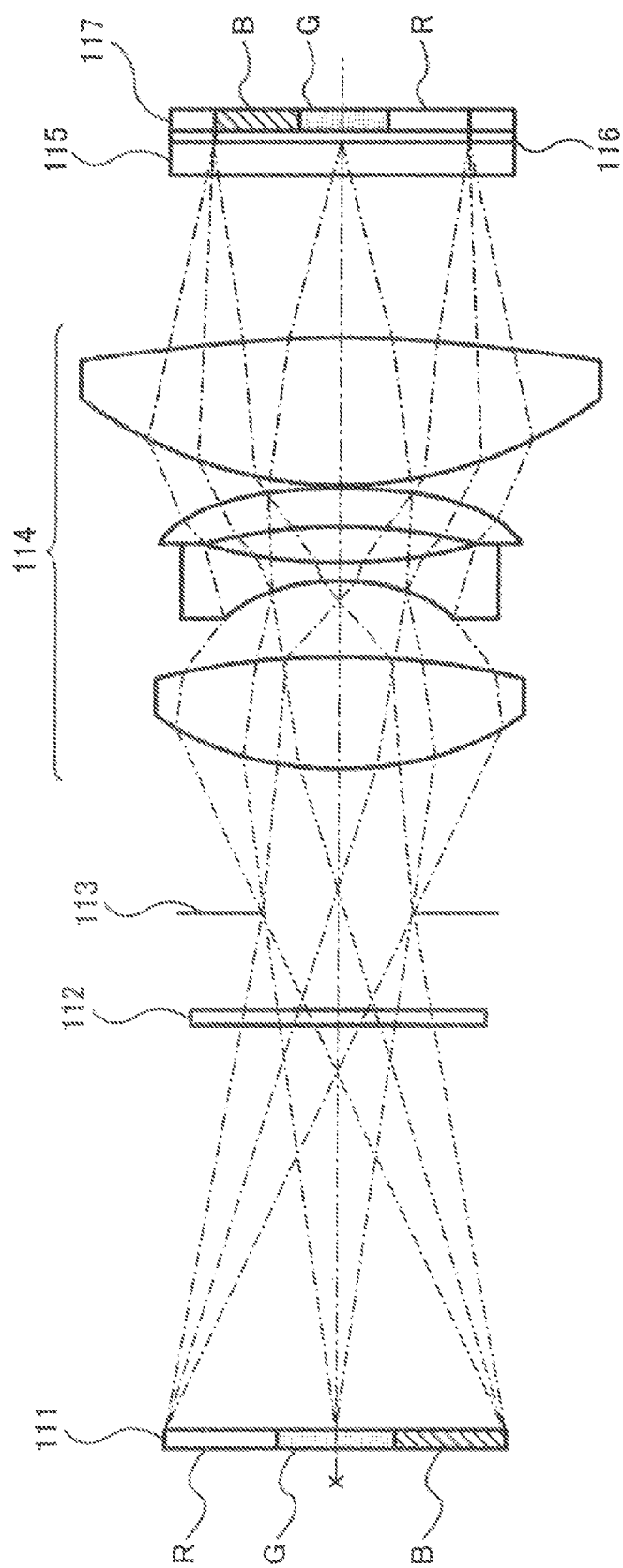
FIG. 11 shows an example of displaying by color-scanning in a projection type color display apparatus according to an embodiment of the present invention.

FIG. 11 shows one example of the displaying by the color-scanning in the projection type color display apparatus according to an embodiment of the invention. The projection type color display apparatus according to the present embodiment includes an array light source 111, a cylindrical microlens array 112, an aperture stop 113, a reduction light condensing optical system 114, a polarization converter 115, a microlens array 116, and a liquid crystal modulator 117.

The array light source 111 is disposed in such a manner that the directivity heads toward an entrance pupil. The array light source 111 is divided into three parts in a direction parallel to an irradiation surface to emit the light of each color of R, G and B. Each of the lights of three colors emitted from the array light source 111 is in a strip-like configuration in a long-side direction thereof. The cylindrical microlens array 112 uniformizes an amount of light of each of the R, G and B color lights irradiated from the array light source 111.

The cylindrical microlens array 112 is disposed to coincide with the aperture stop 113 as the entrance pupil of a rear side focal line. In addition, the aperture stop 113 is disposed adjacent to a front side focal position. Such an arrangement is employed because the reduction light condensing optical system 114 is telecentric.

The reduction light condensing optical system 114 creates a reduced image from the array light source 111 on a light-condensed surface in the long-side direction of the cylindrical microlens array 112. In addition, the cylindrical microlens array 112 fulfills a function like an integrator in a short-side direction thereof. Thereby, it is possible to achieve even, monochromatic light amount distribution in which the uneven light amount and the irregular color by discrete light sources are reduced, in a direction perpendicular to the irradiation surface (i.e. in the short-side direction of the irradiated surface). In addition, the above-described at least one concave lens is included in the reduction light condensing optical system 114 in order to compensate the chromatic aberration.

The polarization converter 115 is disposed in a position behind the reduction light condensing optical system 114 in a direction from a side of the array light source 111 toward an irradiated surface. Because the polarization converter 115 is a telecentric optical system, an incident angle of the illumination light will not be increased by the disposition of the polarization converter 115 at that position. Also, even in a case in which a plastic lens is used, the polarized light will not be influenced by an internal distortion or the like of the plastic lens.

The two-dimensional microlens array 116 and the liquid crystal modulator 117 are disposed in an illuminated surface as an image-formation surface. The light having three separated colors of R, G and B is illuminated on the liquid crystal modulator 117 in the short-side direction thereof, whereas the light in which the uneven light amount and the irregular color are reduced is illuminated on the liquid crystal modulator 117 in the long-side direction thereof. For example, when the illumination light emitted in the order of R, G and B from the light source in a first displaying time has changed to the order of G, B and R after a predetermined time has elapsed from the first displaying time, the illumination in the liquid crystal modulator changes from the illumination of an order of B, G and R to an order of R, B and G. Since the color-scanning is carried out as above for example, it is possible to perform the color-displaying in which the color-flickering is reduced.

The light source apparatus, the optical modulation apparatus, the display apparatus, the light condense illumination apparatus and the projection type color display apparatus described in the foregoing can be applied to a projection device such as a liquid crystal projector, a DMD (Digital Micromirror Device) projector, etc., a vehicle-mounted navigator, various types of display devices, and so on, for example.

The present application is based on and claims priority benefit from Japanese Patent Application No. 2005-216974, filed Jul. 27, 2005 and Japanese Patent Application No. 2006-027132, filed Feb. 3, 2006, the disclosures of those are hereby incorporated by reference herein in their entirety.

Although the present invention has been described in terms of exemplary embodiments, it is not limited thereto. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source apparatus, comprising:
an array light source in which a plurality of emission light sources is arranged;
a divergence characteristic controller disposed corresponding to the array light source and configured to control a divergence characteristic of each of the emission light sources of the array light source; and
a focusing optical element configured to control a directivity of light emitted from each of the emission light sources of the array light source, wherein
the array light source, the divergence characteristic controller, and the focusing optical element are arranged in this order in a direction of emission from the array light source, and
wherein a following formula is satisfied:

$$0.067 \leq L/f < 1.1$$

where an effective diagonal length of the array light source is L and a focal distance of the focusing optical element is f.

2. A light source apparatus, comprising:
an array light source in which a plurality of emission light sources is arranged;
a divergence characteristic controller disposed corresponding to the array light source and configured to control a divergence characteristic of each of the emission light sources of the array light source;
a directivity controller configured to control a directivity of light emitted from each of the emission light sources of the array light source; and
a focusing optical element,
wherein the array light source, the divergence characteristic controller, the directivity controller, and the focusing optical element are arranged in this order in a direction of emission from the array light source, and
wherein a following formula is satisfied:

$$0.2 \leq L/f < 2$$

where an effective diagonal length of the array light source is L and a focal distance of the focusing optical element is f.

3. A light source apparatus, comprising:
an array light source in which a plurality of emission light sources is arranged;
a divergence characteristic controller disposed corresponding to the array light source and configured to control a divergence characteristic of each of the emission light sources of the array light source;
a directivity controller configured to control a directivity of light emitted from each of the emission light sources of the array light source; and
a focusing optical element,
wherein the array light source, the divergence characteristic controller, the directivity controller, and the focusing optical element are arranged in this order in a direction of emission from the array light source, and
wherein a following formula is satisfied:

$$0.067 \leq L/fc < 1.1$$

where an effective diagonal length of the array light source is L and a synthetic focal distance of the directivity controller and the focusing optical element is fc.

4. The light source apparatus according to claim 1, wherein the array light source includes a light-emitting diode or a laser diode.

5. The light source apparatus according to claim 1, wherein the directivity controller comprises at least one positive lens, or at least one plastic lens.

6. The light source apparatus according to claim 2, wherein the directivity controller and the focusing optical element comprise at least one positive lens or at least one plastic lens.

7. An optical modulation apparatus, comprising:
a light source apparatus including:
an array light source in which a plurality of emission light sources is arranged;
a divergence characteristic controller disposed corresponding to the array light source and configured to control a divergence characteristic of each of the emission light sources of the array light source; and
a focusing optical element configured to control a directivity of light emitted from each of the emission light sources of the array light source,
the array light source, the divergence characteristic controller, and the focusing optical element being arranged in this order in a direction of emission from the array light source, and
a following formula being satisfied:

$$0.067 \leq L/f < 1.1$$

where an effective diagonal length of the array light source being L and a focal distance of the focusing optical element being f, and
wherein an optical modulation element is disposed near a part in which a center of the directivity of each of the light sources of the array light source intersects with each other.

8. A display apparatus, comprising:
an optical modulation apparatus; and
a projection optical system,
the optical modulation apparatus including a light source apparatus having:
an array light source in which a plurality of emission light sources is arranged;
a divergence characteristic controller disposed corresponding to the array light source and configured to control a divergence characteristic of each of the emission light sources of the array light source; and
a focusing optical element configured to control a directivity of light emitted from each of the emission light sources of the array light source,
the array light source, the divergence characteristic controller, and the focusing optical element being arranged in this order in a direction of emission from the array light source, a following formula being satisfied:

$0.067 \leq L/f < 1.1$ where an effective diagonal length of the array light source being L and a focal distance of the focusing optical element being f, and an optical modulation element being disposed near a part in which a center of the directivity of each of the light sources of the array light source intersects with each other.

* * * * *